United States Patent
Dunbar et al.

[15] 3,674,795
[45] July 4, 1972

[54] PYRIDYL XANTHATES

[72] Inventors: Joseph E. Dunbar; John W. Zemba, both of Midland City, Mich.

[73] Assignee: The Dow Chemical Company, Midland, Mich.

[22] Filed: Aug. 20, 1970

[21] Appl. No.: 65,741

[52] U.S. Cl. ...................................260/294.8 E, 424/266
[51] Int. Cl. .........................................C07d 31/50
[58] Field of Search...........................260/294.8 E

[56] References Cited

UNITED STATES PATENTS 3,234,228  2/1966  Johnston et al. ...............260/294.8 E

*Primary Examiner*—Alan L. Rotman
*Attorney*—Griswold and Burdick and C. Kenneth Bjork

[57] ABSTRACT

Novel pyridyl Xanthate compounds are prepared by the reaction of a polychloro-4-alkylsulfonyl pyridine or pentachloropyridine with an alkali metal salt of an alkylxanthic acid in the presence of an inert carrier as a reaction medium at a temperature of from bout 20° C. to about 95° C. The novel compounds are active as pesticides.

7 Claims, No Drawings

PYRIDYL XANTHATES

SUMMARY OF THE INVENTION

The present invention is directed to a series of novel pyridyl xanthate compounds and to methods for their preparation. The novel compounds of the present invention are represented by the following structural formula:

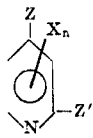

wherein Z and Z' each independently represent

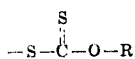

chlorine or bromine with the proviso that one of Z or Z' is always chlorine or bromine;

R represents an alkyl group of from one to about 20, preferably 1 to about 12, both inclusive, carbon atoms;

X represents chlorine or bromine, and n represents an integer of from 1 to 3, both inclusive.

As used in the present specification and claims, the term "alkyl" means saturated, monovalent aliphatic radicals, including straight and branched-chain radicals of from one to twenty carbon atoms, as illustrated by, but not limited to, methyl, n-amyl, n-hexyl, 2-heptyl, 3-methyl-2-octyl, n-octyl, 2-nonyl, 2-tetradecyl, n-hexadecyl, 2-octyl, n-octyl, 2-nonyl, 2-tetradecyl, n-hexadecyl, 2-eicosanyl and the like.

The products of the present invention are oils or crystalline solids at room temperatures, of low solubility in water and of varying degrees of solubility in many common organic solvents. The novel compounds are useful as pesticides and are especially adapted to be employed as active toxicants in compositions for the control of various pests including microbial organisms, such as, for example, powdery and downy mildew, *Pullularia pullulans*, *Trichophyton mentagrophytes*, *Mycobacterium phlei*, *Bacillus subtilis*, *Candida pelliculosa* and the like, and undesirable plant pests such as spiny clotbur, pigweeds and the like.

In one embodiment of the present invention, the novel compounds wherein Z represents

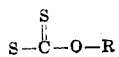

are readily prepared by a novel process wherein a pyridine compound corresponding to the formula:

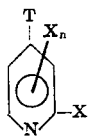

is reacted with an alkali metal salt of an alkylxanthic acid of the formula:

wherein, in the above and succeeding formulas,

T represents $SO_2R'$, chlorine or bromine;

R' represents loweralkyl groups of from one to about four carbon atoms, both inclusive, aryl groups of from about six to about eight carbon atoms, both inclusive loweralkaryl or haloaryl groups;

M is an alkali metal cation, and

X, R and n are as hereinbefore defined.

As used in the present specification and claims, the term "aryl" means phenyl or substituted phenyl groups, such as, for example, tolyl, xylyl and the like. Suitable alkali metal cations operable in the present invention include sodium, potassium and the like.

The reaction of the pyridine and alkylxanthic acid reactants is conveniently carried out in the presence of an inert carrier as a reaction medium. Representative and suitable inert carriers which can be employed as reaction media include water, acetone, dimethylformamide, acetonitrile, carbon tetrachloride, chloroform, benzene, toluene, ethyl methyl ketone, methanol, ethyl acetate, methylene chloride and the like. The reaction ordinarily consumes the reactants in amounts representing essentially equimolar proportions of each and, while not critical, the use of such amounts is preferred. The reaction proceeds smoothly when conducted at temperatures of from about 20° C. to about 40° C. and is preferably carried out at room temperature. While the reaction may be conducted over a wide range of pressures, no particular advantage ordinarily results from the use of subatmospheric or superatmospheric pressures and the reaction is therefore ordinarily carried out at atmospheric pressure.

In carrying out the reaction, the reactants are usually dispersed in separate portions of inert carrier and the resulting dispersions are mixed together in any convenient fashion. The resulting reaction mass is generally maintained with agitation at room temperature for a sufficient period of time to allow substantial completion of the reaction, usually from about 1 to about 30 hours. Following the substantial completion of the reaction, the reaction mass is filtered to remove the alkali metal salt by-products formed during the course of the reaction and then evaporated under reduced pressure to obtain the desired product as a solid or viscous liquid residue. When water is employed as one of the inert carriers, a two-phase liquid reaction mass is formed; after substantial completion of the reaction, the organic portion is separated, dried over anhydrous sodium sulfate and evaporated under reduced pressure as before.

The solid products thus obtained can be further purified by conventional techniques which include washing with a liquid which is a solvent for impurities but not for the product, recrystallization and the like. Many of the viscous liquid residues obtained crystallize on standing to yield the product as a crystalline solid which can then be further purified as above.

In a further embodiment of the present invention, the novel compounds wherein Z' is

are readily prepared by a novel process wherein pentachloropyridine is reacted with an alkali metal salt of an alkylxanthic acid of the type set forth hereinbefore. The reaction is carried out in the presence of dimethylforma-mide as the reaction medium.

The reaction ordinarily consumes the reactants in amounts representing essentially equimolar proportions of each, and, while not critical, the use of such amounts is preferred. The reactants are contacted in any convenient fashion and the resulting reaction mass is heated with stirring at a temperature of from about 80° C. to about 95° C. for a period of time sufficient to assure substantial completion of the reaction, usually from about 2 to about 10 hours. Following the completion of the reaction, the reaction mixture is cooled and filtered to remove the product precipitate formed during the course of the reaction. The crystalline product thus obtained may be further purified by typical procedures such as solvent extraction, recrystallization and the like.

DESCRIPTION OF THE PREFERRED EMBODIMENTS

The following examples illustrate the present invention and the manner by which it can be practiced, but as such, should not be construed as limitations upon the overall scope of the same.

EXAMPLE 1
S-(2,3,5,6-tetrachloro-4-pyridyl)ethylxanthate

A solution of 2,3,5,6-tetrachloro-4-methylsulfonylpyridine (29.5 grams, 0.100 mole) in 200 milliliters of methylene chloride was combined with a solution of potassium ethylxanthate (24.0 grams, 0.150 mole) in 150 milliliters of water, and the resulting two-phase reaction mixture was agitated vigorously at ambient temperatures for about 20 hours. Following the completion of the reaction, the methylene chloride phase was separated from the reaction mixture, dried over anhydrous sodium sulfate, and evaporated to dryness under reduced pressure. As a result of these operations, the desired S-(2,3,5,6-tetrachloro-4-pyridyl)ethylxanthate product was obtained as a yellow crystalline substance. The product was recrystallized from a mixture of petroleum ether and methylcyclohexane to give a pure white crystalline product melting at 95° C. Elemental analysis calculated for $C_8H_5Cl_4NOS_2$ (percent): C, 28.50; H, 1.50; N, 4.16; S, 19.02. Found (percent): C, 28.7; H, 1.45; N, 4.1, S, 19.2.

EXAMPLE 2
S-(2,3,5,6-tetrachloro-4-pyridyl)sec.-butylxanthate

A solution of 2,3,5,6-tetrachloro-4-methylsulfonylpyridine (29.5 grams, 0.100 mole) in 200 milliliters of methylene chloride was combined with a solution of sodium sec.-butylxanthate (25.8 grams, 0.150 mole) in 150 milliliters of water, and the resulting 2-phase reaction mixture was agitated vigorously at ambient temperatures for about 15 hours. Following the completion of the reaction, the methylene chloride phase was separated from the reaction mixture, dried over anhydrous sodium sulfate and evaporated to dryness under reduced pressure. As a result of these operations, the desired S-(2,3,5,6-tetrachloro-4-pyridyl) sec.-butylxanthate product was obtained as a light yellow oil which soon crystallized upon standing; it was recrystallized from a mixture of petroleum ether and methylcyclohexane and the recrystallized material melted at 64.5° to 65.5° C. Elemental analysis calculated for $C_{10}H_9Cl_4NOS_2$ (percent): C, 32.89; H, 2.48; N, 3.84; S, 17.56. Found (percent): C, 33.0; H, 2.50; N, 3.8; S, 17.6.

EXAMPLE 3
S-(2,3,5,6-tetrachloro-4-pyridyl)isopropylxanthate

A solution of 2,3,5,6-tetrachloro-4-methylsulfonylpyridine (29.5 grams, 0.100 mole) in 100 milliliters of methylene chloride was combined with a solution of sodium isopropylxanthate (16.0 grams, 0.10 mole) in 100 milliliters of water and the resulting two-phase reaction mixture was agitated vigorously for about 24 hours at ambient temperatures. Upon completion of the reaction, the methylene chloride layer was separated, dried over anhydrous sodium sulfate, and evaporated to dryness under subatmospheric pressure, leaving the product as a light yellow oil which soon crystallized on standing. The S-(2,3,5,6-tetrachloro-4-pyridyl)isopropylxanthate product thus obtained was recrystallized from ethanol; the recrystallized product melted at 93.5°–95.5° C.

EXAMPLE 4
S-(2,3,5,6-tetrachloro-4-pyridyl)n-pentylxanthate

A solution of potassium n-pentylxanthate (20.2 grams, 0.100 mole) in 200 milliliters of water was added with stirring to a solution of 2,3,5,6-tetrachloro-4-methylsulfonylpyridine (29.5 grams, 0.100 mole) in 200 milliliters of methylene chloride. The resulting 2-phase liquid reaction mixture was stirred vigorously at ambient temperatures for a period of about 3 hours after which period of time the methylene chloride phase was separated, dried over anhydrous magnesium sulfate and evaporated to dryness under reduced pressure. As a result of these operations, there was obtained a viscous liquid containing crystals of unreacted sulfone starting material; the unreacted sulfone was removed from the oil by filtration and the remaining viscous liquid was dried in vacuo. The S-(2,3,5,6-tetrachloro-4-pyridyl)-n-pentylxanthate product was recovered as an oil having a refractive index ($n_D^{25}$) of 1.1059. Elemental analysis calculated for $C_{11}H_{11}Cl_4NOS_2$ (percent): C, 34.84; H, 2.92; N, 3.69. Found (percent): C, 34.7; H, 2.90; N, 3.90

EXAMPLE 5
S-(2,3,5,6-tetrachloro-4-pyridyl)-2-methylbutylxanthate

A solution of potassium 2-methylbutylxanthate (20.2 grams, 0.100 mole) in 150 milliliters of water was added with stirring to a solution of 2,3,5,6-tetrachloro-4-methylsulfonylpyridine (29.5 grams, 0.100 mole) in 150 milliliters of methylene chloride. The resulting 2-phase reaction mixture was agitated vigorously for about 2-½ hours; by thereafter following the procedures as set forth in Example 4, the S-(2,3,5,6-tetrachloro-4-pyridyl)-2-methylbutylxanthate product was obtained as a viscous liquid having a refractive index of ($n_D^{25}$) of 1.6041. Elemental analysis calculated for $C_{11}H_{11}Cl_4NOS_2$ (percent): C, 34.84; H, 2.92; N, 3.69. Found (percent) C, 34.6; H, 2.79; N, 3.70.

EXAMPLE 6
S-(2,3,5,6-tetrachloro-r-pyridyl)-1-ethylpropylxanthate

A solution of potassium 3-pentylxanthate (16.0 grams, 0.078 mole) in 100 milliliters of water was added with stirring to a solution of 2,3,5,6-tetrachloro-4-methylsulfonylpyridine (22.0 grams, 0.078 mole) in 100 milliliters of methylene chloride. The resulting 2-phase reaction mixture was stirred vigorously at ambient temperatures for a period of about 2-½ hours, after which period of time the methylene chloride phase was separated from the reaction mixture and dried over anhydrous magnesium sulfate. Removal of the methylene chloride by evaporation in vacuo left a clear yellow-green oil residue which was purified by exposure to column chromatography using cyclohexane as the eluent and activated alumina as an adsorbent; the S-(2,3,5,6-tetrachloro-4-pyridyl)-1-ethylpropylxanthate product was obtained as a clear, light green liquid which crystallized upon standing at room temperature. One recrystallization from n-hexane gave the purified product as a pale green crystalline solid which melted at 69°–74° C.

EXAMPLE 7
S-(2,3,5,6-tetrachloro-4-pyridyl)-n-dodecylxanthate

A solution of potassium n-dodecylxanthate (21.0 grams, 0.07 mole) in 200 milliliters of water was added with stirring to a solution of 2,3,5,6-tetrachloro-4-methylsulfonylpyridine (21.0 grams, 0.07 mole) in 100 milliliters of methylene chloride and the resulting 2-phase reaction mixture was stirred vigorously at ambient temperatures for about two hours; by thereafter following the procedures as set forth in Example 6, the desired S-(2,3,5,6-tetrachloro-4-pyridyl)n-dodecylxanthate product was obtained as a viscous oil. A portion of the oil was further purified by additional exposure to column chromatography using cyclohexane as the eluent and activated alumina as an adsorbent: the purified product was a yellow-green liquid having a refractive index ($n_D^{25}$) of 1.5650. Elemental analysis calculated for $C_{18}H_{25}Cl_4NOS_2$ (percent): C, 45.29; H, 5.28; N, 2.93. Found (percent): C, 45.8; H, 5.44; N, 3.1.

EXAMPLE 8
S-(2,3,5-trichloro-4-pyridyl)isopropylxanthate

A solution of sodium isopropylxanthate (20.0 grams, 0.13 mole) in 500 milliliters of acetone was combined with a solution of 2,3,5-trichloro-4-methylsulfonylpyridine (26.0 grams, 0.10 mole) in 100 milliliters of acetone; the resulting reaction mixture was stirred for about eight hours at ambient temperatures. Following the above time period, the reaction mixture was filtered to remove the sodium methanesulfinate byproduct formed during the course of the reaction. Concentration of the filtrate by evaporation under subatmospheric pressure yielded the crude product of the desired S-(2,3,5-trichloro-4-pyridyl)-isopropylxanthate; it was recrystallized from methanol and the recrystallized material melted at 74°–76 C.

EXAMPLE 9
S-(2,3,5-trichloro-4-pyridyl)isobutylxanthate

A solution of sodium isobutylxanthate (18.0 grams, 0.10 mole) in 400 milliliters of acetone was combined with a solution of 2,3,5-trichloro-4-methylsulfonylpyridine (26.0 grams, 0.10 mole) in 100 milliliters of acetone and the resulting reaction mixture was stirred under ambient temperature conditions for a period of about 16 hours. Following the completion of the reaction, the reaction mixture was filtered to remove the sodium methanesulfinate by-product formed during the course of the reaction and the filtrate was evaporated to dryness under subatmospheric pressure, leaving a residual oil. The residual oil thus obtained was dissolved in hexane and filtered to remove insoluble material; the hexane was subsequently removed by evaporation in vacuo and the S-(2,3,5-trichloro-4-pyridyl)isobutylxanthate was recovered as a pale yellow, viscous oil having a refractive index ($n_D^{25}$) of 1.6044. Elemental analysis calculated for $C_{10}H_{10}Cl_3NOS_2$ (percent): C, 36.4; H, 3.02; N, 4.24; Cl, 32.2. Found (percent): C, 36.3; H, 3.45; Cl, 32.7.

EXAMPLE 10
S-(2,3,5-trichloro-4-pyridyl)sec.-butylxanthate

Solutions of 2,3,5-trichloro-4-methylsulfonyl-pyridine (26.0 grams, 0.10 mole) in 100 milliliters of acetone and sodium sec.-butylxanthate (18.0 grams, 0.10 mole) in 400 milliliters of acetone were combined and the resulting reaction mixture subsequently treated according to the procedures set forth in Example 9. As a result of these operations, the desired S-(2,3,5-trichloro-4-pyridyl)-sec.-butylxanthate product was recovered as a pale yellow, viscous oil having a refractive index ($n_D^{25}$) of 1.5911 Elemental analysis calculated for $C_{10}H_{10}Clby3NOS_2$ (percent): C, 36.32; H, 3.05; N, 4.24; Cl, 32.17. Found (percent): C, 36.3; H, 3.15; N, 4.3; Cl, 32.7.

EXAMPLE 11
S-(2,3,5-trichloro-4-pyridyl)amylxanthate

Solutions of 2,3,5-trichloro-4-methylsulfonylpyridine (26.0 grams 0.10 mole) in 100 milliliters of acetone and potassium amylxanthate (18.0 grams, 0.10 mole) in 400 milliliters of acetone were combined and the resulting reaction mixture was subsequently treated according to the procedures set forth in Example 9. As a result of these operations, there was obtained the desired S-(2,3,5-trichloro-4-pyridyl)amylxanthate product as a pale yellow, viscous liquid having a refractive index ($n_D^{25}$) of 1.5574. The identity of the structure was confirmed by nuclear magnetic resonance spectrometry.

EXAMPLE 12
S-(2,3,5-trichloro-4-pyridyl)hexylxanthate

The reaction of a solution of 2,3,5-trichloro-4-methylsulfonylpyridine (26.0 grams, 0.10 mole) in 100 milliliters of acetone with a solution of potassium hexylxanthate (23.0 grams, 0.11 mole) in 400 milliliters of acetone was carried out in accordance with the procedures in Example 9, except that the reaction time was for a period of 15 hours. Treatment of the resulting reaction mixture substantially as set forth in Example 9 resulted in the recovery of the desired S-(2,3,5-trichloro-4-pyridyl)-hexylxanthate product as a pale yellow, viscous oil having a refractive index ($n_D^{25}$) of 1.5627. The identity of the structure was verified by nuclear magnetic resonance spectrometry.

EXAMPLE 13
S-(2,3,5,6-tetrachloro-4-pyridyl)isopropylxanthate

A solution of pentachloropyridine (26.0 grams, 0.10 mole) in 100 milliliters of methylene chloride and 100 milliliters of acetone was combined with a solution of sodium isopropylxanthate (16.0 grams, 0.10 mole) in 100 milliliters of water and the resulting 2-phase reaction mixture was stirred at ambient temperatures for a period of about 24 hours. Upon completion of the reaction, the methylene chloride phase was separated, dried over anhydrous sodium sulfate and evaporated under subatmospheric pressure to dryness. The solid residue representing the desired S-(2,3,5,6-tetrachloro-4-pyridyl)-isopropylxanthate product thus obtained was recrystallized from methanol and the recrystallized material melted at 94°–96° C. The identity of the structure was verified by nuclear magnetic resonance spectrometry.

EXAMPLE 14
S-(2,3,5,6-tetrachloro-4-pyridyl)isobutylxanthate

A solution of pentachloropyridine (25.0 grams, 0.10 mole) in 100 milliliters of methylene chloride and 100 milliliters of acetone was combined with a solution of sodium isobutylxanthate (18.0 grams, 0.10 mole) in 100 milliliters of water and the resulting two-phase reaction mixture was stirred at ambient temperatures for a period of about 24 hours. Separation and treatment of the organic layer according to the procedures of Example 13 resulted in the recovery of the desired S-(2,3,5,6-tetrachloro-4-pyridyl)isobutylxanthate product as a pale yellow, viscous liquid having a refractive index ($n_D^{25}$) of 1.5943. The identity of the structure was confirmed as in Example 13.

EXAMPLE 15
S-(2,3,5,6-tetrachloro-4-pyridyl)amylxanthate

A solution of pentachloropyridine (25.0 grams, 0.0995 mole) in 200 milliliters of acetone-methylene dichloride (1:1 by volume) was combined with a solution of potassium amylxanthate (21.0 grams, 0.104 mole) in 100 milliliters of water; the resulting 2-phase reaction mixture was stirred at ambient temperatures for a period of about 44 hours. Subsequent separation of the organic phase and treatment thereof according to the procedures of Example 13 resulted in the recovery of the desired S-(2,3,5,6-tetrachloro-4-pyridyl)amylxanthate as a dark viscous liquid having a refractive index ($n_D^{25}$) of 1.5964. Elemental analysis calculated for $C_{11}H_{11}Cl_4NOS_2$ (percent): N, 3.70. Found (percent): N, 3.69.

EXAMPLE 16
S-(3,4,5,6-tetrachloro-2-pyridyl)ethylxanthate

A mixture of pentachloropyridine (25.0 grams, 0.10 mole) and potassium ethylxanthate (17.0 grams, 0.11 mole) in 100 milliliters of dimethylformamide was heated with stirring at a temperature of about 85° C. for about 4 hours. Upon completion of the reaction, the reaction mixture was cooled to room temperature, poured into water, and filtered to remove the brown precipitate formed during the course of the reaction. The precipitate was extracted with a solution of hot methanol, filtered to remove insoluble products and concentrated by evaporation under subatmospheric pressure to yield the crude product as pale yellow crystals melting at 48°–51° C. Recrystallization of the crude product from methanol yielded the purified S-(3,4,5,6-tetrachloro-2-pyridyl)ethylxanthate; the recrystallized product melted at 51°–53° C. The identity of the structure was confirmed by nuclear magnetic resonance spectrometry.

In a manner similar to that described in Examples 1–15, there are obtained, inter alia, the following pyridylxanthate compounds upon reaction of the respective corresponding polychloro-4-alkylsulfonyl pyridine or pentachlorpyridine reactant with the appropriate alkylxanthic acid reactant:

S-(2,3,5,6-tetrachloro-4-pyridyl)pentadecylxanthate, molecular weight of 519;

S-(2,3,5,6-tetrachloro-4-pyridyl)octadecylxanthate, molecular weight of 561;

S-(2,3,5,6-tetrachloro-4-pyridyl)eicosylxanthate, molecular weight of 589;

S-(2,3-dichloro-4-pyridyl)sec.-butylxanthate, molecular weight of 296;

S-(2,3,5,6-tetrabromo-4-pyridyl)hexylxanthate, molecular weight of 571;

S-(2,5-dibromo-4-pyridyl)octylxanthate, molecular weight of 441;

S-(2,3,5-trichloro-4-pyridyl)decylxanthate, molecular weight of 414.5;

S-(2,3,5,6-tetrabromo-4-pyridyl)decylxanthate, molecular weight of 627;

S-(2,3,5,-tribromo-4-pyridyl)dodecylxanthate, molecular weight of 576;

S-(2,5-dichloro-4-pyridyl)tetradecylxanthate, molecular weight of 436;

S-(2,3,5,6-tetrabromo-4-pyridyl)hexadecylxanthate, molecular weight of 711;

S-(2,3,5-trichloro-4-pyridyl)hexadecylxanthate, molecular weight of 498.5;

In a manner similar to that described in Example 16, there are obtained, inter alia, the following 2-pyridylxanthate compounds upon the reaction of pentachloropyridine and the respective corresponding alkylxanthic acid reactant in the presence of dimethylformamide:

S-(3,4,5,6-tetrabromo-2-pyridyl)hexylxanthate, molecular weight of 571;

S-(3,5-dibromo-2-pyridyl)octylxanthate, molecular weight of 441;

S-(3,5,6-trichloro-2-pyridyl)decylxanthate, molecular weight of 414.5;

S-(3,4,5,6-tetrabromo-2-pyridyl)decylxanthate, molecular weight of 627;

S-(3,4,6-tribromo-2-pyridyl)dodecylxanthate, molecular weight of 576;

S-(3,5-dichloro-2-pyridyl)tetradecylxanthate, molecular weight of 436;

S-(3,4,5,6-tetrabromo-2-pyridyl)hexadecylxanthate, molecular weight of 711;

S-(3,5,6-trichloro-2-pyridyl)hexadecylxanthate, molecular weight of 498.5;

S-(3,5-dibromo-2-pyridyl)octadecylxanthate, molecular weight of 581;

S-(3,4,5,6-tetrabromo-2-pyridyl)eicosylxanthate, molecular weight of 767;

S-(3,5,6-tribromo-2-pyridyl)eicosylxanthate, molecular weight of 688;

S-(3,5-dibromo-2-pyridyl)octadecylxanthate, molecular weight of 581;

S-(3,4,5,6-tetrabromo-2-pyridyl)eicosylxanthate, molecular weight of 767;

S-(3,5,6-tribromo-2-pyridyl)eicosylxanthate, molecular weight of 688;

The products of the present invention are suitable for use as antimicrobials and herbicides. For any of these uses, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing effective amounts of one or more of the compounds hereof. Generally, these amounts range from about 4.0 to about 500 parts per million of one or more of the compounds.

In representative operations, each of the S-(2,3,5,6-tetrachloro-4-pyridyl)ethylxanthate, S-(2,3,5,6-tetrachloro-4-pyridyl)sec.-butylxanthate, and S-(2,3,5,6-tetrachloro-4-pyridyl)n-pentylxanthate compounds gives complete control and kill of powdery mildew on cucumber (Erysiphe cichoracearum) while each of the S-(2,3,5,6-tetrachloro-4-pyridyl)isopropylxanthate and S-(2,3,5,6-tetrachloro-4-pyridyl)isobutylxanthate compounds gives substantially complete control of the same when one of the above-named compounds is separately applied to the environments containing and supporting the disease organisms at a concentration of 150 parts per million by weight.

Through the separate use of one of the S-(2,3,5,6-tetrachloro-4-pyridyl)sec.-butylxanthate, S-(2,3,5,6-tetrachloro-4-pyridyl)ethylxanthate and S-(2,3,5,6-tetrachloro-4-pyridyl)isopropylxanthate compounds there is also obtained complete inhibition of bean mildew while S-(2,3,5,6-tetrachloro-4-pyridyl)-n-dodecylxanthate gives substantially complete inhibition when host plants infected with the disease organism are treated with compositions containing one of the above compounds at a concentration of 4.0 parts per million by weight.

Similarly, S-(2,3,5,6-tetrachloro-4-pyridyl)-1-ethylpropylxanthate gives complete inhibition of downy mildew when such disease organism is contacted with compositions containing the above compound at a concentration of 400 parts per million by weight.

Numerous compositions containing 500 parts of one of the compounds of the present invention as sole toxicant per million parts by weight of ultimate treating composition were prepared and separately applied to the environments containing and supporting thriving members of one of a variety of microbial organisms. The results of the evaluations of the compounds tested at the above concentration and the percent control of the organisms treated are set forth in the following table:

| Compound No. | Subject compound | Percent kill and control of— | | | | | | | |
|---|---|---|---|---|---|---|---|---|---|
| | | P.p. | T.m. | M.p. | B.s. | C.f. | S.a. | C.l. | C.p. |
| (1) | S-(2,3,5,6-tetrachloro-4-pyridyl)n-pentylxanthate | 0 | 100 | 100 | 50 | 100 | 50 | 50 | 50 |
| (2) | S-(2,3,5-trichloro-4-pyridyl)amylxanthate | 100 | 100 | 100 | 100 | 100 | 100 | 100 | 100 |
| (3) | S-(2,3,5-trichloro-4-pyridyl)hexylxanthate | 100 | 100 | 100 | 100 | 100 | 50 | 50 | 50 |
| (4) | S-(2,3,5-trichloro-4-pyridyl)sec.-butylxanthate | 100 | 100 | 100 | 100 | 100 | 50 | 50 | 0 |
| (5) | S-(2,3,5-trichloro-4-pyridyl)isobutylxanthate | 100 | 100 | 100 | 100 | 100 | 100 | 100 | 100 |
| (6) | S-(2,3,5,6-tetrachloro-4-pyridyl)isobutylxanthate | 0 | 100 | 100 | 100 | 100 | 100 | 0 | 100 |
| (7) | S-(3,4,5,6-tetrachloro-2-pyridyl)ethylxanthate | 50 | 100 | 100 | 100 | 50 | 100 | 0 | 50 |
| (8) | S-(2,3,5-trichloro-4-pyridyl)isopropylxanthate | 0 | 0 | 100 | 0 | 0 | 50 | 0 | 0 |
| (9) | S-(2,3,5,6-tetrachloro-4-pyridyl)isopropylxanthate | 0 | 0 | 100 | 0 | 0 | 50 | 0 | 0 |
| (10) | S-(2,3,5,6-tetrachloro-4-pyridyl)2-methylbutylxanthate | 0 | 100 | 100 | 50 | 100 | 50 | 100 | 0 |

NOTE.—P.p.=Pullularia pyllylans; T.m.=Trichophyton mentagrophytes; M.p.=Mycobacterium phlei; B.s.=Bacillus subtilis; C.f.=Cephaloascus fragrans; S.a.=Staphylococcus aureus; C.l.=Ceratocystis IPS; C.p.=Candida pelliculosa.

In other representative operations, S-(2,3,5,6-tetrachloro-4-pyridyl)isobutylxanthate gives complete control and kill of Spiny clotbur and S-(2,3,5,6-tetrachloro-4-pyridyl)-2-methylbutylxanthate gives complete control and kill of pigweeds when such plants are contacted with compositions containing one of the above-named compounds at a concentration of 4.0 parts per million by weight.

The pentachloropyridine compound employed as a starting material as set forth in the foregoing teachings can be prepared in accordance with known procedures. For example, see U.S. Pat. No. 3,359,267.

The polychloro-4-alkylsulfonyl pyridine compounds employed as starting materials in the present invention are prepared by known methods. In a representative operation, 2,3,5,6-tetrachloro-4-(methylsulfonyl)pyridine is prepared by adding 30 percent hydrogen peroxide (27.0 grams) dropwise to a solution of 2,3,5,6-tetrachloro-4-methylthiopyridine (20.0 grams) and 100 milliliters of glacial acetic acid. The resulting reaction mass is stirred and maintained at reflux temperature for about 3 hours, poured into ice water, and the resulting precipitate representing the desired product is filtered off. Other starting materials of this type are similarly prepared by utilizing this method with the appropriate chemical analogs.

Alkylxanthates of the type employed as starting materials in the present invention are known and can be prepared by conventional methods or readily obtained from commercial sources.

We claim:

1. A compound corresponding to the formula:

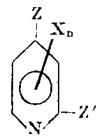

wherein
Z and Z' each independently represent

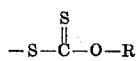

chlorine or bromine, with the proviso that one of Z or Z' is always chlorine or bromine;

R represents an alkyl group of from one to about 20, both inclusive, carbon atoms;

X represents chlorine or bromine, and $n$ represents an integer of from 1 to 3, both inclusive.

2. A compound of claim 1 wherein Z' represents

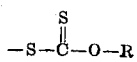

3. A compound of claim 1 wherein Z represents

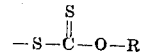

and R represents an alkyl group of from one to about 12, both inclusive, carbon atoms.

4. The compound of claim 1 which is S-(2,3,5-tri-chloro-4-pyridyl)-amylxanthate.

5. The compound of claim 1 which is S-(2,3,5,6-tetrachloro-4-pyridyl)-n-dodecylxanthate.

6. The compound of claim 1 which is S-(2,3,5-trichloro-4-pyridyl)isobutylxanthate.

7. The compound of claim 1 which is S-(3,4,5,6-tetrachloro-2-pyridyl)ethylxanthate.

* * * * *

UNITED STATES PATENT OFFICE
CERTIFICATE OF CORRECTION

Patent No. 3,674,795          Dated 4 July 1972

Inventor(s) Joseph E. Dunbar and John W. Zemba

It is certified that error appears in the above-identified patent and that said Letters Patent are hereby corrected as shown below:

Column 1, line 10, should be

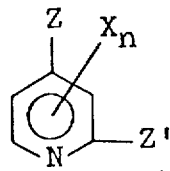

Column 2, line 56, dimethylforma-mide should be dimethylformamide.

Column 5, line 28, $C_{10}H_{10}Clby3NOS_2$ should be $C_{10}H_{10}Cl_3NOS_2$.

Signed and sealed this 10th day of April 1973.

(SEAL)
ttest:

DWARD M. FLETCHER, JR.
ttesting Officer

ROBERT GOTTSCHALK
Commissioner of Patents